Nov. 24, 1942.　　P. F. POWELSON　　2,302,801
STUMP-REMOVING DEVICE
Filed May 25, 1942　　2 Sheets-Sheet 1

Phil F. Powelson
INVENTOR.

BY Cleveland B. Hollabaugh
ATTORNEY

Nov. 24, 1942. P. F. POWELSON 2,302,801
STUMP-REMOVING DEVICE
Filed May 25, 1942 2 Sheets-Sheet 2
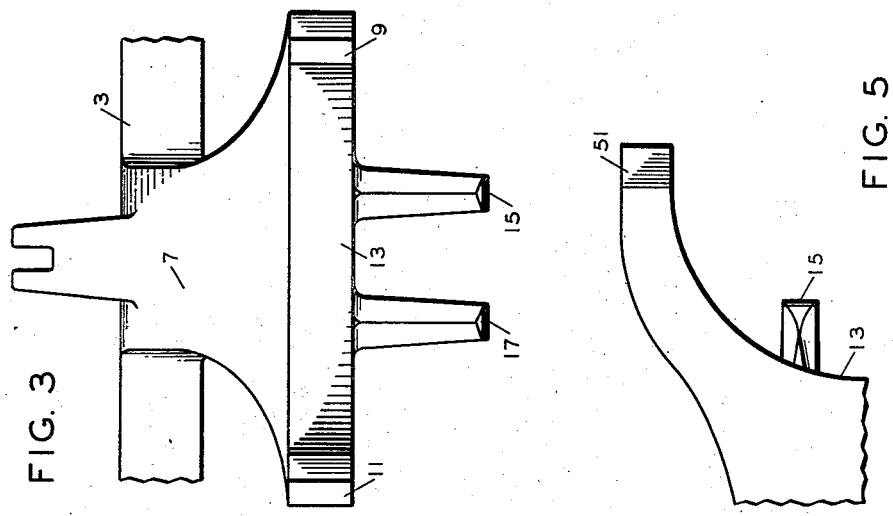
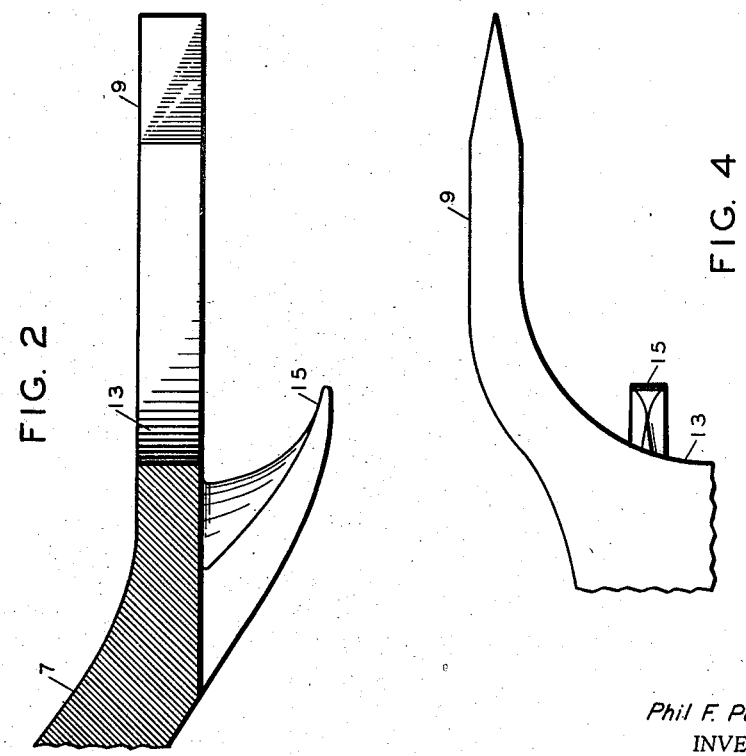
Phil F. Powelson
INVENTOR.
BY Cleveland B. Stoledaugh
ATTORNEY Patented Nov. 24, 1942

2,302,801

UNITED STATES PATENT OFFICE 2,302,801

STUMP-REMOVING DEVICE

Phil F. Powelson, Shorewood Hills, Wis., assignor to Hercules Powder Company, Wilmington, Del., a corporation of Delaware Application May 25, 1942, Serial No. 444,381

4 Claims. (Cl. 37—2)

This invention relates to devices for removing low-cut stumps and particularly to improvements in low-cut stump removing devices in combination with machines which are known as tractors.

Various prior art devices in combination with tractors have been resorted to for effecting stump removal. These devices usually have a splitting wedge mounted to one side of the tractor in combination with forwardly directed plow-like portions, which serve to split the stump, loosen the earth around the stump and/or cut the roots thereof, respectively, so that the stump may be readily removed from the soil. The plow-like portions are usually affixed to a movable yoke and are usually extended to impart an up-lift force to the loosened stump when the yoke is raised. These prior art devices have met with but limited success, particularly for the removal of low-cut stumps in compacted soil, due primarily to the high torsional forces developed in loosening and removing the stump from the soil. The development of high torsional forces increases the operating cost of the machine, reduces the longevity of the machine and jeopardizes the health and safety of the operator. For example, a stump splitting wedge mounted to one side of a tractor, upon impact with a rigid stump tends to throw the operator laterally from his seat and inasmuch as the machine controls are directly forward, the operator does not have sufficient means for properly bracing himself to withstand the impact. It is, therefore, necessary to adopt special precautionary measures to safeguard the operator or employ a tractor so heavy that impact force becomes negligible.

Now in accordance with the present invention these difficulties have been overcome and in addition thereto other novel and beneficial results are obtained.

A principal object of the present invention is to provide a device for removing stumps which resolves all forces, utilized in removing a stump from the soil substantially about the centerline of thrust of the tractor.

It is a further object of the invention to provide a stump splitting device which serves the dual purpose of splitting the stump and then subsequently limiting lateral movement of the stump as it is being removed from the soil.

A still further object of the invention is to provide a semi-circular stump engaging pocket which aligns the center of thrust of the tractor with the stump and which also imparts an overturning force to the stump which greatly reduces the up-lift force.

Still another object of the invention is the provision of inclined root engaging members which impart up-lift and support to the stump when it is being removed from the soil.

Other and further objects of the invention will be obvious upon an understanding of the illustrated embodiments to be described or will be indicated in the appended claims and various advantages not referred to herein will occur to one skilled in the art upon employment of the invention in practice.

Generally described the present invention comprises a movable supporting unit, such as a tractor, having a yoke member pivotally mounted thereon and a stump splitting, engaging, and grasping member integral with the yoke member, together with means for raising the yoke and thereby removing a stump.

A preferred embodiment of the invention has been chosen for purposes of illustration and description and is shown in the accompanying drawings forming a part of this specification wherein Fig. 1 is a perspective view of the device showing a tractor and attached stump-removing means;

Fig. 2 is a fragmentary sectional view of the stump-removing means;

Fig. 3 is a fragmentary front elevational view of the stump-removing means;

Fig. 4 is a fragmentary plan view of the stump-removing means; and

Fig. 5 is a plan view of a modification of the stump-removing means.

Figure 1:
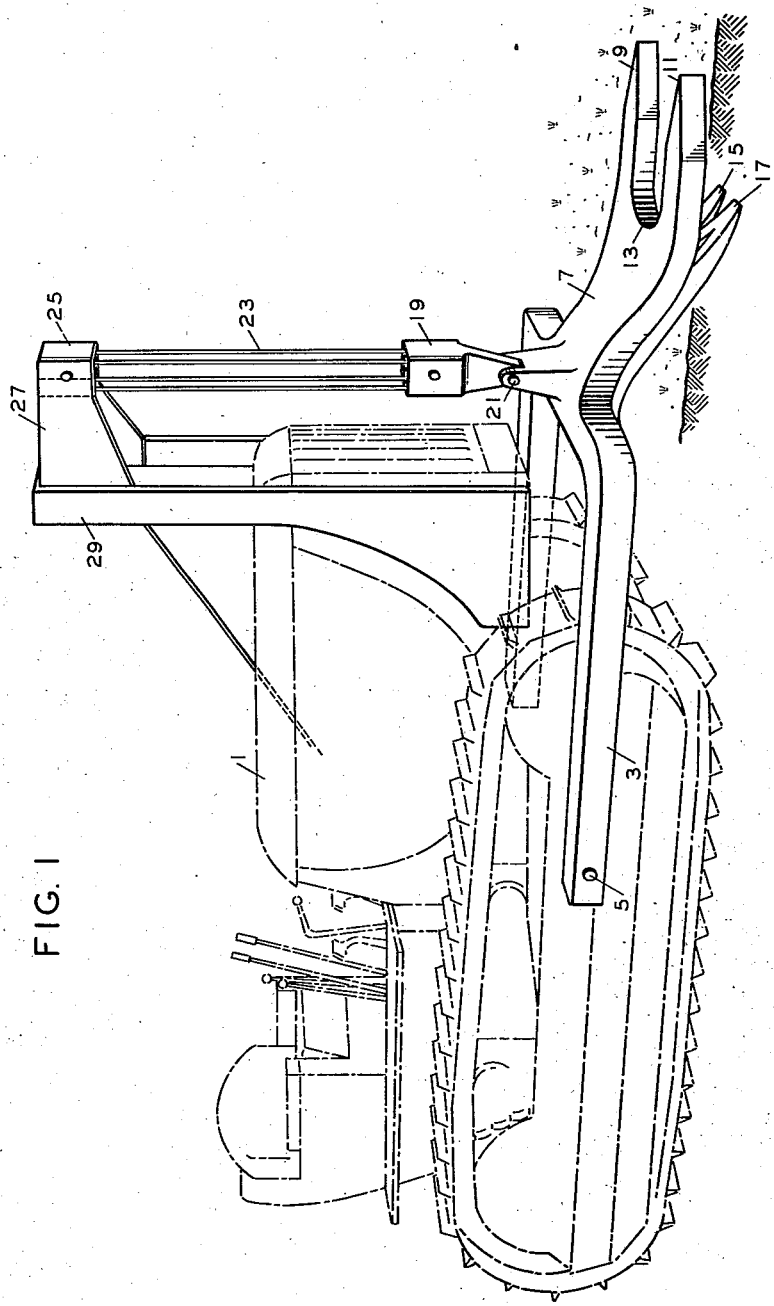

Referring to the drawings for a more detailed description of the invention, the movable supporting unit selected for purposes of illustration comprises an endless tread tractor unit I. It is to be understood, however, that a truck, farm tractor, four-wheel Diesel tractor, etc., having the desired power, weight and mobility, would serve equally well. The tractor unit is provided with suitable power and control mechanism to permit its ready operation by one man. This type of tractor unit, together with the yoke which will be described hereinafter, is well-known, being commonly called "Pushdozer" and hence will not be described in greater detail.

Referring to Figures 1 through 4 of the drawings, the tractor I has pivotally mounted thereon a yoke 3. The arms of yoke 3, as is shown in Fig. 1 are pivotally mounted on pins 5 which in turn are secured to the framework of the tractor by suitable means (not shown). The pivot point of the yoke 3 is preferably located within the middle third of the distance between the front and rear ends of the tractor tread and preferably not above the axis of the endless tread wheels. It will be realized, of course, that the pivot axis of the yoke may be fixed in any desired manner to meet the exigencies of the particular situation. Preferably, however, the pivot axis should be in close proximity to the center of gravity of the tractor unit.

The arms of the yoke member 3 may be of any suitable material and cross-sectional shape which will afford sufficient structural strength to withstand the severe impact stress imposed upon the yoke during operation of the device.

The forward end of the yoke 3 has an assembly 7 distending therefrom which consists of stump splitting members 9 and 11, semi-circular stump engaging pocket 13 and root grasping or prong members 15 and 17. The assembly 7 distends downwardly and forwardly from the yoke so that, when the lower extremities of splitting members 9 and 11 are approximately at ground elevation and the prong members 15 and 17 are plowing the ground, the yoke member 3 lies in a substantially horizontal plane.

One of the important features of the present invention resides in the downwardly and forwardly projecting prong members 15 and 17. These members distend from the lower portion of the assembly 7 and their lower extremities are disposed beneath the pocket 13. The function of the downwardly and forwardly projecting prong members 15 and 17 is to dig into the ground under the stump and thus provide additional grasping and lifting means for removing the stump. These means, together with the arms 9 and 11 and pocket 13 enable the secure grasping of a stump and particularly a low-cut stump to remove it from the ground. It will be appreciated that the weight of the yoke 3 and the assembly 7 is of rugged and heavy construction and that the weight is sufficient, under the forward impetus of the tractor unit, to cause the members 15 and 17 to dig into the ground under a stump. In the removal of large stumps which have to be split, the prong members 15 and 17 dig into the ground during the splitting operation thereby loosening the ground around the stump which aids materially in facilitating the subsequent removal of the stump.

Another important feature of the present invention resides in the semi-circular pocket 13. One function of the semi-circular pocket is to align the stump-removing device and the stump so that the centerline of thrust of the stump-removing device is substantially diametrically aligned with the stump to be removed. This condition is accomplished due to the curved surfaces of the semi-circular pocket 13 which guide the stump-removing device into proper alignment thereby eliminating eccentric forces. Another function of the semi-circular pocket 13 is to impart an overturning moment to the stump, thereby greatly reducing the amount of up-lift force necessary to remove the stump from the soil.

In order to hold the yoke 3 and assembly 7 in a raised position when the device is moved from place to place and to raise the stump after it has been loosened by the assembly 7, suitable means are provided for raising and lowering the yoke 3 and the assembly 7 which is affixed thereto. In the illustrative embodiment this is accomplished by the provision of what may best be termed a block and fall arrangement utilizing a pair of multiple pulley blocks. One of the pulley blocks 19 is pivotally connected to the assembly 7 by a pivot pin 21. A cable 23 engages the pulley block 19 and a pulley block 25 which is disposed vertically of pulley block 19. The block 25 is secured to a supporting member 27 which in turn is affixed to a bent 29. The bent 29 is rigidly secured to the frame members of the tractor 1 and thereby forms a rigid support for the yoke 3 and assembly 7 by means of cable 23. The cable 23 has one end anchored to the supporting member 27 and passes over the pulleys in blocks 19 and 25 and thence to a suitable cable drum winding or hoisting device (not shown) having a direct drive from the tractor. It will be realized, of course, that other suitable means may be utilized for raising and lowering the yoke 3 and assembly 7, for example, cylinders actuated by a motive fluid or a rack and gear mechanism.

In the operation of the device, the tractor unit 1 with the yoke 3 and assembly 7 in raised position are moved in the vicinity of the stump to be removed. The yoke and assembly are then lowered to a position such that the splitting members 9 and 11 are approximately level with the surface of the ground and the prong members 15 and 17 are in the ground. A splitting member, for example, 9, is aligned with the center of the stump and motive power is applied to the tractor, thereby driving member 9 through the stump and splitting it. If necessary, this procedure may be repeated about the periphery of the stump splitting it into desired segments. During this procedure the prong members 15 and 17 are, of course, plowing the ground around the stump thereby loosening the soil from the stump roots. After the stump has been split as desired, the splitting member is disengaged from the stump and the tractor is again moved forward so that the members 9 and 11 embrace the upwardly projecting portion of the stump and the prongs 15 and 17 dig down under the roots. As the tractor continues to move forward the yoke 3 and assembly 7 are raised by the cable 23 so that the stump is pushed and subsequently lifted from the ground. When the stump is entirely removed from the ground, the stump is freed from the device by the operator lowering the removed stump to the ground and backing away. The device is then ready for the next stump-removing operation.

In some soils it may be necessary to adopt a different procedure. For example, in a very sandy soil or badly eroded soil, the soil may lack sufficient resistance to withstand the splitting operation. That is to say, the impact of a splitting member would tend to dislodge the stump from the ground. When this condition exists it is only necessary to embrace the stump with members 9 and 11 and remove the stump as described above. In Fig. 5, member 51 illustrates a modification to the assembly 7 which may be utilized where the splitting of stumps prior to their removal is not feasible or required. This modification may also be employed when it is desired to have but one distended splitting member. However, when considerable stump splitting is necessary, it is desirable to employ two stump splitting members which will prove the more feasible from an operating and maintenance viewpoint.

In the drawings the device is illustrated as integral but it is, of course, to be understood that the device may be built in composite sections, and fitted together by welding, riveting, bolting, etc. This is particularly desirable of the impact members 9, 11, 15 and 17. It will be realized, of course, that additional strengthening and reinforcing members may be provided if necessary and/or desirable. For example, where unusually rigid stumps are encountered, it will be found desirable to provide lateral reinforcing members from the yoke 3 to the splitting members 9 or to the members 51, or a combination of these members, as the case may be.

The stump-removing device of the present invention has many advantages over prior devices and is particularly adapted for the removal of low-cut stumps, since the prong members 15 and 17 dig into the ground below the roots and insure a positive grasp on the stumps. It is possible with the device to get all of the stump wood that is in the ground and with less wear and tear on the equipment. In comparison with other devices now available for accomplishing the removal of low-cut stumps, the device of the present invention is more compact, less cumbersome, more easily handled, and more economical. It, of course, represents a smaller investment both from the initial standpoint and also from the standpoint of maintenance. As compared to stump removal by other methods commonly used, the stump is recovered in a much better condition which is extremely important when the stumps are to be subsequently processed.

As various changes may be made in the form, construction and arrangement of parts without departing from the spirit and scope of the invention, it is to be understood that all matter herein is to be interpreted as illustrative and not in a limited sense.

This application is a continuation-in-part of my application for U. S. Letters Patent, Serial No. 391,475 filed May 2, 1941.

What I claim and desire to protect by Letters Patent is:

1. A stump-removing device of the class described comprising a stump engaging member, splitting members extending forwardly from said engaging member in spaced relationship to form a substantially semi-circular pocket therebetween, and blunt-edged prongs extending from the under portion of the engaging member rearwardly of the pocket and continuing downwardly and forwardly to form a stump receiving seat with said pocket and adapted to engage the roots of a stump, said pocket preventing transverse movement of said stump relative to the movement of said device during the stump removal operation.

2. A stump-removing device of the class described comprising a stump engaging member, a splitting member extending forwardly from said engaging member and a guide member extending forwardly from said engaging member in spaced relationship to form a substantially semi-circular pocket between the splitting member and the guide member, and blunt-edged prongs extending from the under portion of the engaging member rearwardly of the pocket and continuing downwardly and forwardly to form a stump receiving seat with said pocket and adapted to engage the roots of a stump, said pocket preventing transverse movement of said stump relative to the movement of said device during the stump removal operation.

3. A stump-removing device of the class described comprising a movable power unit, support means pivotally mounted on said unit, a substantially semi-circular member carried by said support means, said member being adapted for engageable relationship with a substantial portion of a stump, prong elements extending downwardly from said member and outwardly to form a seat with said member upon which said stump may be supported during removal of said stump together with its roots from the ground.

4. A stump-removing device of the class described comprising a movable power unit, support means pivotally mounted on said unit, a substantially semi-circular splitting member carried by said support means, said member being adapted for engageable relationship with a substantial portion of a stump, prong elements extending downwardly from said member and outwardly to form a seat with said member upon which said stump may be supported during removal of said stump together with its roots from the ground.

PHIL F. POWELSON.